May 15, 1945.   R. C. STOLTE   2,375,959
STEERING BY BRAKING
Filed May 24, 1943
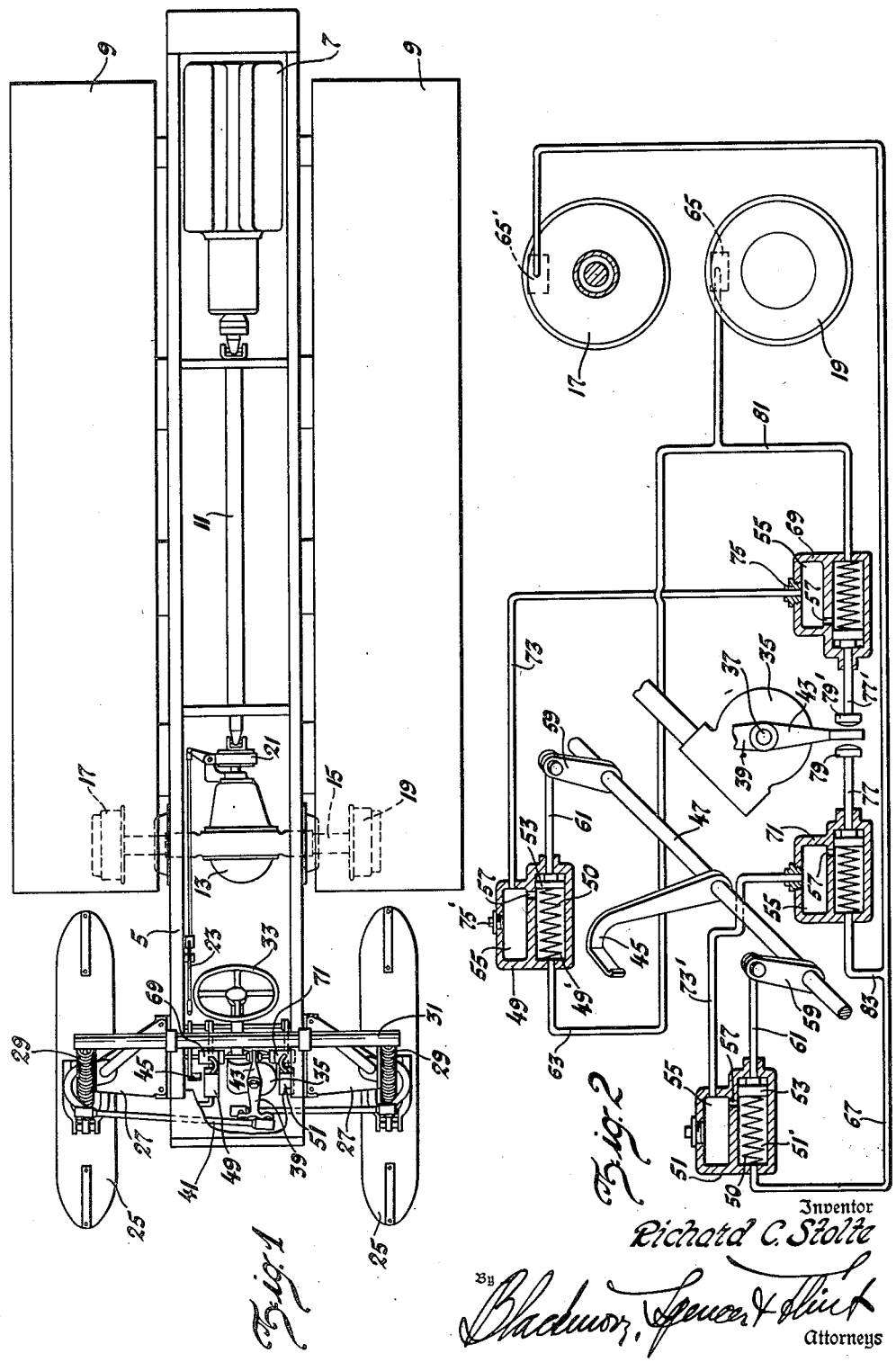
Inventor
Richard C. Stolte
By Blackmore, Spencer & Flint
Attorneys Patented May 15, 1945

2,375,959

UNITED STATES PATENT OFFICE 2,375,959

STEERING BY BRAKING

Richard C. Stolte, Birmingham, Mich., assignor to General Motors Corporation, Detroit, Mich., a corporation of Delaware Application May 24, 1943, Serial No. 488,108

9 Claims. (Cl. 180—9.2)

This invention relates to motor vehicles and more particularly to vehicles supported in part by endless tracks and in part by dirigible members like skis. Such vehicles are especially useful for travelling over deep snow, being driven by a motor operating the endless tracks and being steered by the turning of the dirigible members.

With vehicles of this kind it is usual to provide a supplemental steering device in the form of braking means which may be used to retard the rotation of that one of the endless tracks on the side of the vehicle toward which the turn is being made. Such supplementary steering by braking the drive to one of the tracks has been effected by the simple expedient of a separate braking system for each track, there being a pedal for each system. When the need arises, as where the dirigible members are on a smooth icy surface for example, the operator selects and applies the appropriate brake pedal.

The present invention aims to simplify the work of the operator by relieving him of the attention required in making the selection since it is designed to use a single brake pedal for applying either brake, the selection being made by the act of steering the dirigible members, that very steering so controlling the braking means that the depression of the steering brake pedal will apply the appropriate brake.

It is then the main object of the invention to provide for an automatic selection of the steering brake which is to be applied, only if its use be desired, by the application of a single brake applying means.

As a more specific object the main object is to be accomplished by automatically selecting the available steering brake system in response to the act of steering the dirigible steering members.

Another object is to render the device foolproof by a construction so designed that the steering brake, if applied by the pedal, will be automatically released in response to a straight-away position of the dirigible steering members even in the event of failure of the operator to release the pedal operating the steering brake.

Other objects, including the simple structural arrangements by which the major objects are accomplished, will be understood from the description which follows.

On the drawing, Fig. 1 is a plan view of a vehicle supported by dirigible skis and by driven endless treads. Fig. 2 is a diagrammatic view showing the novel steering brake and its relation to the steering means for the dirigible members.

On the drawing numeral 5 is applied to the vehicle frame. On the frame there is an engine 7 driving the broad tractor treads 9 by means of a propeller shaft 11, the latter employing a differential within housing 13 for jack shafts 15 suitably connected for driving the treads in a well known way. The drawing shows brake drums 17 and 19 associated with the right and left jack shafts. Within the drums are to be used conventional shoe assemblies. The shoes are applied by conventional hydraulic wheel cylinders. These are the brakes which are to be selectively applied to assist in steering. For simply retarding the rate of travel there is shown a propeller shaft brake 21 which may be operated by lever 23. It will be understood that in place of the propeller shaft brake any other conventional retarding brake may be used such as a hydraulic brake system with the usual master cylinder, conduits and wheel cylinders, the latter being within drums 17 and 19 if so desired and being independent of the wheel cylinders constituting parts of the steering brake and arranged to apply the same or other shoes. This retarding service brake is not a part of my invention and it need not be further described.

At its front end, the vehicle is supported on dirigible skis 25. Brackets 27 extend laterally from the frame. Not fully shown because it is no part of the invention, are intermediate parts by which the skis may turn for steering and may tilt in vertical planes, the latter movement being restrained by springs such as 29 located between the skis and a cross bar abutment 31 carried by the frame. A hand steering wheel 33 is operable through the instrumentality of a steering shaft and suitable gearing within a gear box 35 to rotate a shaft 37 carrying an arm 39, the latter connected by steering links 41 to turn the skis and steer the vehicle.

On shaft 37 is an arm 43 extending diametrically opposite arm 39. It is this arm which is to bias the steering brake means in the manner referred to above. For the steering brake I may use as the manually operable member a pedal 45 secured to a rock shaft 47. There are two more or less conventional master cylinder members 49 and 51, each with a piston 53 adapted to reciprocate in the cylinders 49' and 51' forming parts of the members 49 and 51. The pistons are biased to inoperative positions by springs 50. Each member 49 and 51 also includes a reservoir 55 and a passage 57 between the cylinder and reservoir which may cut off communication between the reservoir and the part of the cylinder in advance of the piston in response to movement of the piston. Shaft 47 has crank arms 59 connected to the pistons by rods 61. A conduit 63 from cylinder 49' affords communication between cylinder 49' and wheel cylinder 65 in one of the brake drums, the left drum in the illustrated embodiment. A conduit 67 similarly connects cylinder 51' with wheel cylinder 65' within brake drum 17, the right drum of the figures. There are used two other substantially conventional master cylinder members. They are represented by numerals 69 and 71. A conduit 73 connects reservoir 55 of cylinder member 49 with the similar reservoir 55 of cylinder member 69. This conduit may enter cylinder member 69 through an apertured plug 75, the supply and vent plug 75' of cylinder member 49 serving for both member 49 and 69. In precisely the same way a conduit 73' connects the reservoir parts of members 51 and 71. The members 69 and 71 are oppositely disposed so that the piston rods 77 and 77' and pistons move in opposite directions in the process of covering the openings 57. The adjacent ends of the rods 77 and 77' lie near each other and terminate in abutments 79, 79' on opposite sides of lever arm 43 referred to above. The arrangement is completed by a conduit 81 connecting an intermediate part of conduit 63 with the end of the cylinder part of member 69 and a similar conduit 83 connecting an intermediate part of conduit 67 with the end of the cylinder part of member 71.

The operation of the mechanism will be readily understood. With the parts in the relative positions shown, arm 43 being out of contact with both heads 79 and 79' depression of the pedal will apply neither brake. The flow of brake fluid from cylinder 49' through conduit 63 cannot overcome the resistance to movement of the shoes in brake drum 19 because there is a free passage for the flow of fluid through conduit 81, cylinder member 69, conduit 73 and into reservoir 55 of member 49. In a similar manner the flow of fluid from cylinder 51' fails to apply the brake members within drum 17. Instead the flow of fluid is through passage 83, member 71, and conduit 73' and into the reservoir of member 51. The condition described is of course that wherein the skis are positioned for straightaway travel. If there be need to check the speed of travel it is only necessary to operate lever 23 to apply brake 21 or to use any other conventional braking means operable equally upon both tracks. This type of vehicle is intended more particularly for use on snow and the steering is in most cases effected solely by the dirigible members. It will be seen that when so steering the arm 43 turns along with arm 39 but it merely pushes one of the piston rods 77 or 77', to some extent, enough to close off the communication between the respective reservoir and cylinder. Any considerable movement may cause a flow of fluid to the master cylinder reservoirs as will be readily seen but neither brake will be applied. Should it be found necessary or desirable to supplement the steering effected by the skis by applying one of the steering brakes, as when the skis are on ice for example, the operator merely depresses the pedal 45 and the steering brake on that side toward which the turn is being made is applied. For example, if the skis are manipulated for a right turn arm 39 is turned clockwise. Arm 43 is similarly turned. Rod 77 is pushed and its piston cuts off communication between the reservoir within member 71 and that part of its cylinder to the left of the piston. Thereupon the operator may depress the pedal. The fluid from cylinder 51' can no longer pass through 83 and the cylinder member 71 since its flow is blocked by the covering of passage 57. Therefore the flow of fluid through conduit 67 actuates cylinder 65' of the right brake drum. The right track is therefore retarded. Since rod 77' remains as shown the flow from cylinder 49' has no effect on the left brake means and the vehicle is steered to the right. Steering toward the left is effected in a similar manner, rod 77 remaining as shown so that master cylinder 51' is inoperative while master cylinder 49' becomes operative to apply the brakes within drum 19 and steer the vehicle to the left.

It will be noted, too, that if the operator should neglect to release pedal pressure when he again returns the hand steering wheel to straight away position arm 43, nevertheless, swings to the position shown and the return flow of fluid from the applied brake occurs just as effectively as if the operator had released his foot pressure on the pedal.

It will be seen that while in straightaway driving the operator may hold pedal 45 depressed and when he turns the hand wheel he will at once be using both the steering skis and the appropriate steering brake.

It has been stated above that the several cylinder members are substantially conventional. That is to be understood as meaning that any of the known master cylinders may be used. It is realized that in the master cylinder, as shown, the passage at 57 may be too small for the best results. There are numerous well known master cylinders wherein a very free passage is afforded between the cylinder proper and its reservoir when the piston is in its inactive position. Some one of these may be selected. The simple form shown is illustrative of the many master cylinders where a passage 57 of one kind or another provides the necessary communication when the piston is retracted by its spring 50.

It will be obvious that a vehicle with dirigible steering means and with wheels instead of endless treads may be similarly equipped, the wheels carrying the steering brakes.

I claim:

1. In a vehicle, a rotary mechanism on each side thereof for partially supporting said vehicle, dirigible supporting means for completing the support of said vehicle, steering means to turn said dirigible means for steering, two independent brake systems each having an applying member, a brake actuating member associated with one of said rotary mechanisms and connections therebetween, a single manually operable member to act jointly on both said applying members, each system being normally inoperative in response to movement of said manually operable member but including a part adapted to be moved to render its system operable, other means acting in response to a movement of said steering means from straight-away position to move the one or the other of said parts and thereby render operative by movement of said manually movable member, the system with which said part is associated.

2. The invention defined by claim 1, said brake systems being hydraulic, said applying members being master cylinders, said brake actuating member being brake shoe actuating cylinders, and said connections being hydraulic conduits.

3. In a vehicle, rotary mechanisms on each side thereof for supporting one end of said vehicle, dirigible supporting means for the other end thereof, steering means for said dirigible means, two independent brake systems one for each of said rotary mechanisms and each system including a master cylinder and reservoir, a brake shoe actuating cylinder for one of said rotary mechanisms, a first conduit between said master cylinder and brake shoe actuating cylinder, a branch conduit connecting an intermediate part of said first conduit to the reservoir and normally inoperative blocking means for each of said branch conduits, means acting in response to said steering means to move one or the other of said blocking means whereby one only of said systems is available for the purpose of steering.

4. In a vehicle, a rotary mechanism on each side thereof for partially supporting said vehicle, dirigible supporting means for completing the support of said vehicle, steering means to turn said dirigible means for steering, normally inoperative brake systems one for retarding each of said rotary mechanisms, other means acting in response to said steering means to render one or the other of said brake systems operable, and a single applying member adapted to simultaneously act on both systems and to act effectively only on that system which has been rendered operative, said brake systems being hydraulic and each including a master cylinder and reservoir unit, a conduit and a brake shoe actuating cylinder, a branch conduit from an intermediate part of said first conduit to said master cylinder reservoir; each said branch conduit including a secondary cylinder and reservoir unit with a connecting passage between the cylinder and reservoir thereof, and other means operable to block the flow through the passage of one only of said secondary units whereby the applying means may apply the brake of one only of said systems.

5. In a vehicle, a rotary mechanism on each side thereof for partially supporting said vehicle, dirigible supporting means for completing the support of said vehicle, steering means to turn said dirigible means for steering, normally inoperative brake systems one for retarding each of said rotary mechanisms, other means acting in response to said steering means to render one or the other of said brake systems operable, and a single applying member adapted to simultaneously act on both systems and to act effectively only on that system which has been rendered operative, said brake systems being hydraulic and each including a master cylinder and reservoir unit, a conduit and a brake shoe actuating cylinder, a branch conduit from an intermediate part of said first conduit to said master cylinder reservoir, each said branch conduit including a secondary cylinder and reservoir unit with a connecting passage between the cylinder and reservoir thereof, said secondary cylinder and reservoir units being mounted in opposed relation, pistons in the cylinders of said units and rods connected to said pistons the ends of said rods being adjacent each other and one on either side of said other means.

6. In a vehicle, a rotary mechanism on each side thereof for partially supporting said vehicle, dirigible supporting means for completing the support of said vehicle, steering means to turn said dirigible means for steering, normally inoperative brake systems one for retarding each of said rotary mechanisms, other means acting in response to said steering means to render one or the other of said brake systems operable, and a single applying member adapted to simultaneously act on both systems and to act effectively only on that system which has been rendered operative, said brake systems being hydraulic and each including a master cylinder and reservoir unit, a conduit and a brake shoe actuating cylinder, a branch conduit from an intermediate part of said first conduit to said master cylinder reservoir, each said branch conduit including a secondary cylinder and reservoir unit with a connecting passage between the cylinder and reservoir thereof, said cylinder and reservoir units being mounted in opposed relation, pistons in the cylinders of said units and rods connected to said pistons the ends of said rods being adjacent each other, said steering means including a rock shaft and said other means being an arm secured to said rock shaft.

7. In a vehicle having rotatable supporting members, hydraulic brake systems one for independently retarding each rotatable member said systems being inoperable to check straightaway travel and each including a master cylinder and reservoir unit, a main conduit and a brake shoe actuating cylinder, a branch conduit connecting an intermediate part of the main conduit to said reservoir, together with other means to block the passage through one or the other of said branch conduits and a single brake applying means connected for operating simultaneously upon both master cylinder units whereby one only of said systems is effective.

8. The invention defined by claim 7 together with dirigible means to assist in supporting the vehicle, steering means for said dirigible means, said other means being moved by said steering means.

9. The invention defined by claim 7 each said branch conduit forming an hydraulic passage including a second conduit, a cylinder and a third conduit, said cylinder having an inlet from the second conduit and a passage therefrom to the third conduit, a piston in said last named cylinder adapted to be moved by said other means to close said passage.

RICHARD C. STOLTE.